United States Patent
Yokoyama et al.

(10) Patent No.: US 9,120,051 B2
(45) Date of Patent: Sep. 1, 2015

(54) METHOD AND DEVICE FOR TREATING EXHAUST GAS CONTAINING CARBON DIOXIDE

(75) Inventors: Koichi Yokoyama, Kure (JP); Shigehito Takamoto, Kure (JP); Eiji Miyamoto, Kure (JP); Naoki Oda, Kure (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 387 days.

(21) Appl. No.: 13/819,888

(22) PCT Filed: Aug. 29, 2011

(86) PCT No.: PCT/JP2011/069424
§ 371 (c)(1),
(2), (4) Date: Mar. 6, 2013

(87) PCT Pub. No.: WO2012/029704
PCT Pub. Date: Mar. 8, 2012

(65) Prior Publication Data
US 2013/0152782 A1    Jun. 20, 2013

(30) Foreign Application Priority Data
Aug. 30, 2010 (JP) ................................. 2010-192212

(51) Int. Cl.
*B01D 53/14* (2006.01)

(52) U.S. Cl.
CPC ........ *B01D 53/1412* (2013.01); *B01D 53/1475* (2013.01); *B01D 53/1493* (2013.01); *B01D 2252/60* (2013.01); *Y02C 10/06* (2013.01)

(58) Field of Classification Search
None
See application file for complete search history.

(56) References Cited

U.S. PATENT DOCUMENTS

| 5,378,442 A | 1/1995 | Fujii et al. |
| 2012/0308469 A1* | 12/2012 | Yokoyama et al. ........ 423/437.1 |

FOREIGN PATENT DOCUMENTS

| JP | 5-245340 | 9/1993 |
| JP | 07-209271 | 8/1995 |
| JP | 09-000875 | 1/1997 |
| JP | 3739437 B2 * | 1/2006 |

OTHER PUBLICATIONS

English translation of JPH09875 (the same translation for JP 3739437 B2), accessed Apr. 16, 2015.*
International Search Report mailed Nov. 1, 2011 for International application No. PCT/JP2011/069424.

* cited by examiner

*Primary Examiner* — Duane Smith
*Assistant Examiner* — Phillip Shao
(74) *Attorney, Agent, or Firm* — Fay Sharpe LLP

(57) ABSTRACT

An object of the present invention is to provide a method for treating an exhaust gas containing $CO_2$, that can adjust the concentration of an oxidation inhibitor in an absorbent to the concentration enough to inhibit oxidation, without measuring the concentration of the oxidation inhibitor in an alkanolamine contained in a $CO_2$ absorbent. Disclosed are a method and a device for adjusting the compositional ratio of an absorbent, in which absorption and release of carbon dioxide are performed by adding an oxidation inhibitor to an alkanolamine absorbent when the sum of the concentrations of ammonia and an alkylamine in an absorber column outlet gas of a $CO_2$ absorption equipment.

5 Claims, 3 Drawing Sheets

2 Cooler
3 Heat Exchanger
7 Absorber column
8 Desorber column
9 Absorbent
10 Combustion exhaust gas
11 Carbon dioxide
12 GC instrument
13 Oxidation inhibitor addition port

[Fig. 1]
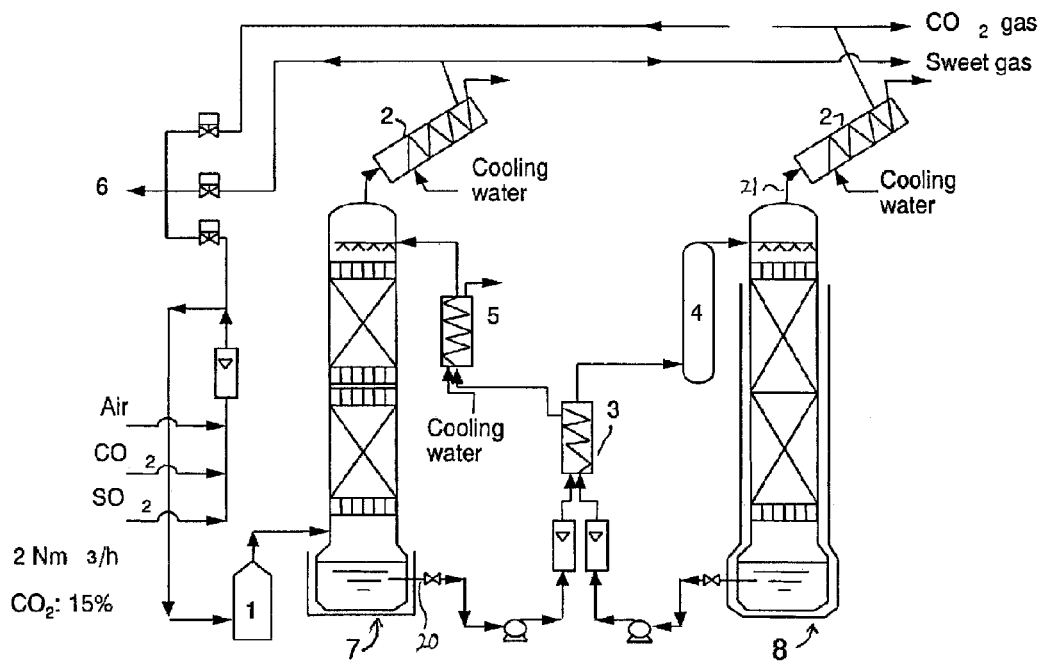
1 : Humidifier  5 : Amine cooler
2 : Condenser  6 : Gas monitor
3 : Heat Exchanger  7 : Absorber column
4 : Preheater  8 : Desorber column

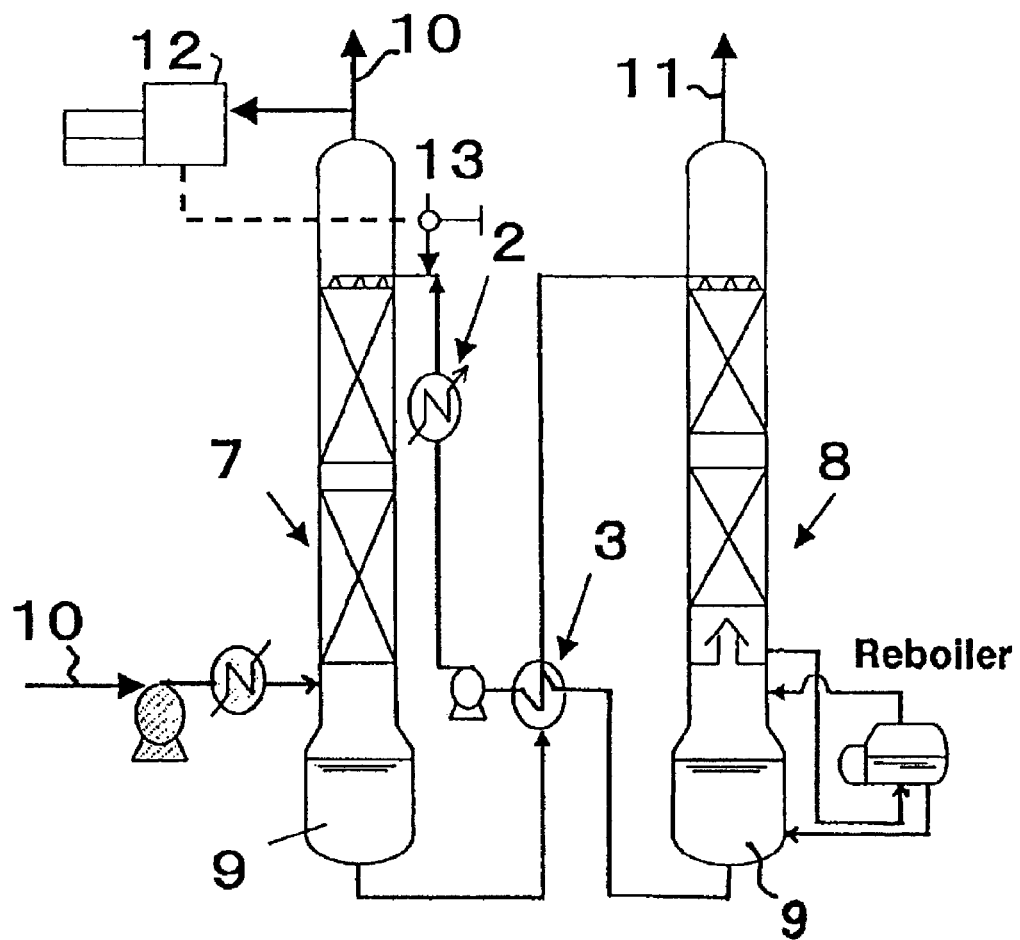
[Fig. 2]
- 2 Cooler
- 3 Heat Exchanger
- 7 Absorber column
- 8 Desorber column
- 9 Absorbent
- 10 Combustion exhaust gas
- 11 Carbon dioxide
- 12 GC instrument
- 13 Oxidation inhibitor addition port

[Fig. 3]
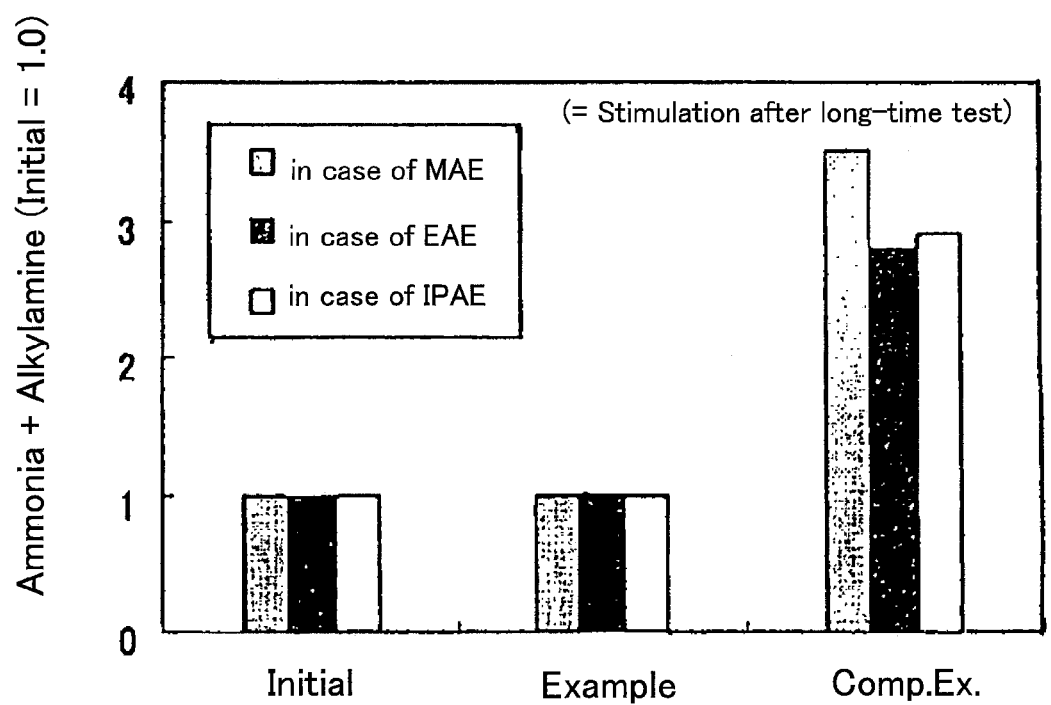

METHOD AND DEVICE FOR TREATING EXHAUST GAS CONTAINING CARBON DIOXIDE

TECHNICAL FIELD

The present invention relates to a method for treating an exhaust gas containing carbon dioxide ($CO_2$), and particularly to a method and a device for treating an exhaust gas, in which carbon dioxide ($CO_2$) is recovered from an exhaust gas of a combustor such as a boiler.

BACKGROUND ART

It has been said that, in a thermal power station and the like, carbon dioxide ($CO_2$) is generated by combustion of fossil fuels such as coal to increase the concentration of $CO_2$ in the atmosphere, leading to a rise in atmospheric temperature, and thus causing various environmental problems. In order to prevent global warming, the Kyoto Protocol was adopted at the Kyoto Conference to stop global warming (COP3) on December 1997. The Kyoto Protocol came into effect on February 2005, and measures for the reduction of $CO_2$ emission have been implemented in each country. Among methods for recovering $CO_2$ from a combustion exhaust gas containing oxygen ($O_2$) and sulfur oxide ($SO_X$) of the thermal power station and the like, a $CO_2$ absorption method using an alkanolamine solution is exemplified as a method that would be put into practice in the near future. A study on the method has intensively been made from the 1990s, and types of alkanolamines suited for the recovery of $CO_2$ and conditions of application to an exhaust gas containing sulfur oxide have been studied (Patent Document 1). When compared with monoethanolamines that have hitherto been used, these amines are less likely to be oxidized with oxygen contained in a combustion exhaust gas, however, in view of the use for a long time such as several thousands hours or more, the replenishment amount of a solution of these amines due to oxidative degradation of the solution would cause a problem. To cope with this problem, it has become possible to remarkably inhibit oxidation of amines in an absorbent by adding an oxidation-inhibiting substance (for example, an organic sulfur compound) of amines to a $CO_2$ absorbent (Patent Document 2).

With respect to a device for the recovery of $CO_2$ contained in a combustion exhaust gas of a boiler, research and development have been made, most widely, on a carbon dioxide recovery device using an absorber column that brings an aqueous alkanolamine solution into contact with an exhaust gas, and a desorber column that recovers $CO_2$ by heating the amine solution that has absorbed $CO_2$ (for example, Non-Patent Document 1).

When an aqueous solution of an alkanolamine is used as a carbon dioxide ($CO_2$) absorbent recovery device, the alkanolamine in the absorbent is partially oxidized and decomposed by an oxidizing component such as $O_2$ or NOx in a combustion exhaust gas, particularly oxygen to produce ammonia. It is known that ammonia is decomposed and produced from an alkanolamine, and also, there is a patent in which ammonia produced in the recovery of $CO_2$ by the alkanolamine is used for denitration of a combustion exhaust gas (Patent Document 3). It is also known that alkylamins such as methylamine, ethylamine, and isopropylamine are respectively produced from alkanolamines such as 2-(methylamino)ethanol (MAE), 2-(ethylamino)ethanol (EAE), and 2-(isopropylamino)ethanol (IPAE), in proportion to the degree of oxidation of the alkanolamine, and thus the release amounts of these products are decreased by an oxidation inhibitor (for example, Patent Document 2). Patent document 2 discloses that water ($H_2O$), oxalic acid (($COOH)_2$), and ammonia ($NH_3$) are produced by an oxidation reaction of $H_2NCH_2CH_2OH$ (MEA) as shown in the following formula (1).

$$H_2C_2H_4OH + 2O_2 \rightarrow NH_3 + (COOH)_2 + H_2O \tag{1}$$

PRIOR ART LIST

Patent Documents

Patent Document 1: JP 3529855 B
Patent Document 2: JP 3739437 B
Patent Document 3: JP 2786562 B Non-Patent Documents Non-Patent Document 1: Chemical Engineering Manual (Kagaku Kogaku Binran), page 627

SUMMARY OF THE INVENTION

Problems to be Resolved by the Invention

It is also possible to inhibit oxidation of amines in a $CO_2$ absorbent by increasing the concentration of an organic sulfur compound which is added in the absorbent as an oxidation inhibitor. However, these compounds are originally less likely to dissolve in the absorbent, and also there are some compounds such as the organic sulfur compound whose concentration is difficult to be measured, or the measurement method is unclear with respect to some compounds, and thus causing a problem that it is difficult to control the concentration of the oxidation inhibitor per se.

An object of the present invention is to provide a method and a device for treating an exhaust gas containing $CO_2$, that can adjust the concentration of an oxidation inhibitor in a $CO_2$ absorbent to the concentration enough to inhibit oxidation, without measuring the concentration of the oxidation inhibitor in an alkanolamine contained in the absorbent.

Means for Solving the Problems

In order to achieve the above object, inventions to be claimed in the present application are as follows.

(1) A method for treating an exhaust gas containing carbon dioxide ($CO_2$), in which absorption and release of $CO_2$ are performed from an exhaust gas containing carbon dioxide using, as a $CO_2$ absorbent, an aqueous solution of an alkanolamine represented by $C_nH_{2n+1}NHC_nH_{2n'+1}O$ (n is any integer of 1 to 4, and n' is any integer of 1 to 3), the method comprising
measuring the concentration of an alkylamine represented by $C_nH_{2n+1}NH_2$ (n is any integer of 1 to 4) or the sum of the concentration of the alkylamine and the concentration of ammonia in an exhaust gas after absorbing carbon dioxide by the absorbent; and
adding an oxidation inhibitor of the alkanolamine to the $CO_2$ absorbent according to an increase in the concentration of the alkylamine or the sum of the concentration of the alkylamine and the concentration of ammonia.

(2) The method according to (1), wherein the alkanolamine is one, or two or more compound(s) selected from the group consisting of 2-(methylamino)ethanol, 2-(ethylamino)ethanol, 2-amino-2-methyl-1-propanol, and 2-(isopropylamino)ethanol.

(3) The method according to (1) or (2), wherein the oxidation inhibitor of the alkanolamine is one, or two or more organic sulfur compound(s) selected from mercaptoimidazoles and mercaptobenzimidazoles.

(4) A device for treating an exhaust gas containing carbon dioxide, comprising:

an absorber column that brings an absorbent containing an alkanolamine into contact with an exhaust gas containing oxygen and carbon dioxide;

a desorber column that heats the absorbent containing carbon dioxide absorbed therein, thereby recovering carbon dioxide, in which at least a part of the absorbent, that has recovered carbon dioxide in the absorber column, is conveyed to the desorber column, and at least a part of the absorbent, that has separated carbon dioxide in the desorber column, is conveyed, as a carbon dioxide absorbent, to the absorber column;

heat exchange means configured to perform heat exchange between the solution to be conveyed to the desorber column from the absorber column and the solution to be conveyed to the absorber column from the desorber column;

measuring means configured to measure the concentration of an alkylamine or the sum of the concentration of the alkylamine and the concentration of ammonia in the exhaust gas treated in the absorber column;

means configured to add an oxidation inhibitor of the alkanolamine to the absorbent to be conveyed to the absorber column from the desorber column; and a controller configured to adjust the additive amount of the oxidation inhibitor of the alkanolamine according to the concentration of the alkylamine or the sum of the concentration of the alkylamine and the concentration of ammonia measured by the measuring means.

The alkanolamine of the $CO_2$ absorber used in the present invention is preferably an alkanolamine represented by $C_nH_{2n+1}NHC_{n'}H_{2n'+1}O$ (n is any integer of 1 to 4, and n' is any integer of 1 to 3), and particularly preferably 2-(methylamino)ethanol (hereinafter abbreviated to MAE, molecular weight: 75.12), 2-(ethylamino)ethanol (hereinafter abbreviated to EAE, molecular weight: 89.14), 2-amino-2-methyl-1-propanol (hereinafter abbreviated to AMP, molecular weight: 89.14), or 2-(isopropylamino)ethanol (hereinafter abbreviated to IPAE, molecular weight: 103.16), or a mixture of two or more of these alkanolamines in view of the magnitude of a $CO_2$ absorption rate, and low heat of dissociation of absorbed $CO_2$.

An oxidation inhibitor used in the present invention can be selected from among mercaptoimidazoles represented by the following structural formula (A) and/or mercaptobenzimidazoles represented by the following structural formula (B):

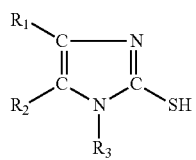

(A)

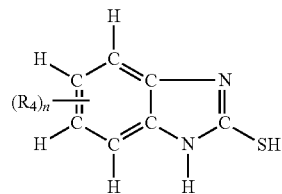

(B)

wherein $R_1$, $R_2$ and $R_3$ each independently represents a hydrogen atom, a $C_1$ to $C_3$ alkyl group, a phenyl group, or a benzyl group, $R_4$ is a hydrogen atom or a $C_1$ to $C_3$ alkyl group, and n is an integer of 1 to 3.

Advantageous Effects of the Invention

According to the present invention, it is possible to control the concentration of an oxidation inhibitor in an absorbent to the concentration enough to inhibit oxidation without directly measuring the concentration of the oxidation inhibitor which inhibits decomposition of an alkanolamine in the absorbent by measuring the concentration of an alkylamine, or the concentrations of an alkylamine and ammonia in an exhaust gas. Thus, it becomes easier to control the replenishment amount of alkanolamine into the absorbent of $CO_2$ absorption equipment during operation.

BRIEF DESCRIPTION OF THE DRAWINGS

FIG. 1 is an explanatory drawing showing flow of a $CO_2$ recovery device according to Example of the present invention.

FIG. 2 is an explanatory drawing of a $CO_2$ recovery device of the present invention provided with an oxidation inhibitor concentration controller.

FIG. 3 is an explanatory drawing showing the results of Examples and Comparative Examples of the present invention.

EMBODIMENTS FOR CARRYING OUT THE INVENTION

The present invention enables the adjustment of the compositional ratio of a carbon dioxide absorbent by adding, as an oxidation inhibitor, a solution prepared by dissolving an organic sulfur compound in an aqueous alkanolamine solution in advance to an absorbent that is circulated to an absorber column from a desorber column, according to an increase or decrease in the above-mentioned concentration of an alkylamine or the sum of the concentration of the alkylamine and the concentration of ammonia in an exhaust gas treated in the absorber column, and thus effectively inhibiting oxidation of the alkanolamine in the absorber column.

The present inventors estimated that, with respect to oxidation reactions of the above-mentioned $CH_3HNC_2H_4OH$ (MAE), $C_2H_5HNC_2H_4OH$ (EAE), and $(CH_3)_2CHHNC_2H_4OH$ (IPAE), reactions of the following formulae (2) to (4) arise similarly to the scheme (1) to produce methylamine, ethylamine, and isopropylamine, together with oxalic acid.

$CH_3HNCH_2CH_2OH+2O_2 \rightarrow CH_3NH_2+(COOH)_2+H_2O$ (2)

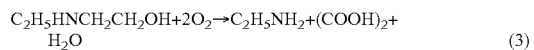

$C_2H_5HNCH_2CH_2OH+2O_2 \rightarrow C_2H_5NH_2+(COOH)_2+H_2O$ (3)

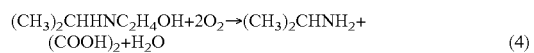

$(CH_3)_2CHHNC_2H_4OH+2O_2 \rightarrow (CH_3)_2CHNH_2+(COOH)_2+H_2O$ (4)

The present inventors clarified that the state of progress of the oxidation reaction of an alkanolamine in an absorbent can be monitored by using the fact that the amount of the oxidation decomposition of the alkanolamine is proportional to the amounts of the production of ammonia, alkylamine, and oxalic acid, shown in the schemes (1) to (4), and measuring the amounts of the production of these compounds. As is apparent from the present inventors' study, when the alkanolamine is oxidized, ammonia is produced in addition to the alkylamine, although the production pathway is unclear, and thus it is preferred to measure both concentrations of the alkylamine and ammonia as compared with the case of measuring only the concentration of the alkylamine.

Almost all of ammonia and alkylamine, the amounts of the production of which are measured in the present invention, are vaporized in an absorber column and then released in a vapor phase as a gaseous substance since each boiling point (ammonia: −33.4° C., methylamine: −6.32° C., ethylamine: 16.6° C., isopropylamine: 33° C. to 34° C.) is lower than an absorbent temperature (commonly 40° C. or higher). Therefore, after sampling an exhaust gas containing these gaseous substances at an absorber column outlet, the concentrations of ammonia and alkylamine in the gas can be directly measured by a gas chromatography (hereinafter abbreviated to GC) instrument. It is also possible that the exhaust gas is sampled at the same rate as a flow rate of an exhaust gas at an absorber column outlet and passed through an acidic solution thereby recovering the ammonia or alkylamine in the solution, and then the concentrations of those substances in the recovered solution by an ion chromatographic (hereinafter abbreviated to IC) instrument, and thus the concentration in the gas can be calculated from the amount of a suction gas and the amount of the recovery of the substance. These methods can be carried out within a short time (within several hours) and it is possible to monitor the oxidation state of an absorbent, almost continuously.

Apart from the present invention, it is possible to measure the concentration of oxalic acid in the solution, for example, by an IC instrument or a GC/mass spectrometry (hereinafter abbreviated to GC/MS) instrument. However, there is a problem that it is difficult to measure a change in concentration with satisfactory precision because of low concentration of oxalic acid in the solution, and that it is difficult to perform continuous measurement because the measurement requires a long time. Therefore, the method of the present invention is more suited for the purpose of monitoring the state of progress of an oxidation reaction of the alkanolamine in the absorbent.

In the present invention, the concentration of the alkanolamine in the absorbent is adjusted by using the fact that the amounts of ammonia and alkylamine produced in proportion to oxidation decomposition of the alkanolamine is proportional to the amount of the oxidation of the alkanolamine in the absorbent. For example, when the concentrations of one or more alkylamines in an exhaust gas, or the sum of the concentrations of ammonia and one or more alkylamines increases with the lapse of time, an oxidation inhibitor is added so that the concentration of the oxidation inhibitor in the absorbent increases with the increased amount. When the sum of the concentrations does not decrease nor vary, the concentration of the oxidation inhibitor to be added to the alkanolamine can be controlled to a proper value by decreasing the amount of the oxidation inhibitor to be added in the absorbent, or stopping the addition.

The oxidation inhibitor used in the present invention is preferably one or more organic sulfur compound(s) selected from among mercaptoimidazoles and/or mercaptobenzimidazoles. This is because these substances are less likely to be oxidized with oxygen contained in a combustion exhaust gas, and most substances function for the purpose of only inhibiting oxidation of an alkanolamine. The concentrations of these organic sulfur compounds in the solution can be measured by a GC/MS instrument. However, since it is difficult to continuously carry out analyses, the use of the method of the present invention enables continuous measurement and control of the concentration in the solution.

When the other oxidation inhibitor to the alkanolamine, for example, a reducing agent such as sodium L-ascorbate or gallic acid is added, the reduction effect is exerted. However, since the concentration of the oxidation inhibitor in the solution is drastically decreased by an influence of oxygen contained in a combustion exhaust gas, it is difficult to control the concentration of the oxidation inhibitor in the solution.

EXAMPLES

FIG. 1 is an explanatory drawing showing flow of $CO_2$ absorption equipment according to an example of the present invention. A simulated combustion exhaust gas is fed to the absorber column 7 through the humidifier 1, and comes in contact with an absorbent that flows down from a column top while the gas goes upward in the absorber column 7, thereby absorbing $CO_2$. After collecting mist in the water cooling portion provided in the column upper portion, the exhaust gas is guided to a gas outlet line and then released into the atmosphere through the condenser 2. An absorbent rich in $CO_2$ discharged from the absorber column 7 (rich absorbent) is discharged from the absorber column through the solution outlet line 20. The rich absorbent passes though a pump is introduced into the heat exchanger 3. After heating, the rich absorbent is fed to the desorber column 8, where the rich absorbent flows down in a desorber column, an outer wall of which is heated by a heater, to release $CO_2$. The released $CO_2$ which passes through the column top outlet line 21 of the desorber column is released into the atmosphere through the condenser 2, while a condensed solution returns to the desorber column 8. A lean absorbent, that has released $CO_2$ while flowing down in the desorber column 8, is extracted from the bottom portion of the desorber column using a pump, and reaches the heat exchanger 3, where the solution is cooled by heat exchange with the rich absorbent. After passing through the amine cooler (heat exchanger) 5, the solution is recirculated to the absorber column 7. In this case, the column diameter of both the absorber column 7 and the desorber column 8 is $\phi$50 mm, and the height of a packed bed is 1.4 m.

Using the equipment shown in FIG. 1, a test was performed in which $CO_2$ is absorbed and removed from a simulated combustion exhaust gas containing $O_2$ and $N_2$ in addition to $CO_2$ by using a $CO_2$ absorbent containing an oxidation inhibitor of an alkanolamine. Main test conditions were as follows: absorber column inlet gas and solution temperature: 30° C., desorber column inlet solution temperature: 100° C., desorber column solution temperature: maximum 110° C., condenser temperature: 30° C., the amount of gas: 2 $m^3$/h, and solution-gas ratio: 3.0 (L/$m^3$). The amount of the circulation of the absorbent was 7 L. As the alkanolamine for use in the $CO_2$ absorbent, three types thereof, MAE, EAE, and IPEA were used, and methylamine, ethylamine, and isopropylamine were used respectively as a decomposition product of each alkanolamine. As the oxidation inhibitor, 2-mercaptobenzimidazole was used.

After initiating the test, a gas was extracted through branching from an outlet gas of an absorber column at a rate of 1 L/min every 6 hours and passed through an absorption bottle containing 100 ml of 0.01N HCl for 1 hour. The concentrations of ammonia and alkylamine in an outlet gas were then calculated by measuring the concentration of a decomposition product in the solution by an ion chromatograph. In addition, the outlet gas was sampled by a syringe and then the concentrations of ammonia and alkylamine in the gas were measured by a GC instrument comprising a FID detector. Oxidation of an oxidation inhibitor of an organic sulfur compound does not proceed within a short time. Therefore, the concentrations of ammonia and alkylamine in the outlet gas under the initial conditions described below were measured, and then an operation was performed using an absorbent containing low concentration of the inhibitor as long-time operation simulation conditions in which the oxidation inhibitor has decomposed, and thus it was confirmed whether or not the concentrations can be adjusted to the concentrations of ammonia and alkylamine in the outlet gas similar to those under initial conditions.

<Initial Conditions>

Each of an aqueous solution containing MAE in the concentration of 38% by weight, an aqueous solution containing EAE in the concentration of 45% by weight, and an aqueous solution containing IPAE in the concentration of 52% by weight was used as an absorbent, 2-mercaptobenzimidazole was used as an organic sulfur compound, and the concentration of the compound in the absorbent was adjusted to 0.1% by weight. The concentrations of ammonia and alkylamine in an outlet gas after an absorption test were measured (unit: mol/m$^3$N), and the sum of the concentrations was used as a reference value.

<Long-Time Operation Simulation Conditions>

The concentration of 2-mercaptobenzimidazole was adjusted to 0.005% by weight, and other conditions are the same conditions as the initial conditions.

Example 1

While circulating the absorbent under the long-time simulation conditions, an absorbent containing 2.5% by weight of 2-mercaptobenzimidazole and 38% by weight of MAE was fed by 0.05 L at a flow rate which accounts for 5% of the flow rate of the absorbent after passing the heat exchanger 5 of the equipment of FIG. 1. One hour and a half after feeding, the concentrations of ammonia and alkylamine (methylamine in this case) in an absorber column outlet gas were measured. When the concentrations are higher, when compared with those under the initial conditions, 0.05 L of the solution was fed under the same conditions as mentioned above. Finally, the solution was fed in the amount of 0.35 L in total. In that case, the amount of the circulation of the absorbent was adjusted so that a solution-gas ratio was 3.0.

Example 2

The concentrations of ammonia and alkylamine (ethylamine in this case) in an absorber column outlet gas were measured under the same conditions as in Example 1, except that an absorbent containing 2.5% by weight of 2-mercaptobenzimidazole and 45% by weight of EAE was used while circulating the absorbent under the long-time simulation conditions. The solution was fed in the amount of 0.35 L in total. In that case, the amount of the circulation of the absorbent was adjusted so that a solution-gas ratio was 3.0.

Example 3

The concentrations of ammonia and alkylamine (isopropylamine in this case) in an absorber column outlet gas were measured under the same conditions as in Example 1, except that an absorbent containing 2.5% by weight of 2-mercaptobenzimidazole and 52% by weight of IPAE was used while circulating the absorbent under the long-time simulation conditions. The solution was fed in the amount of 0.35 L in total. In that case, the amount of the circulation of the absorbent was adjusted so that a solution-gas ratio was 3.0.

Comparative Example 1

Using an absorbent containing 38% by weight of MAE as an alkanolamine under the long-time operation simulation conditions, the amount of the circulation of the absorbent was adjusted so that a solution-gas ratio was 3.0.

Comparative Example 2

Using an absorbent containing 45% by weight of EAE as an alkanolamine under the long-time operation simulation conditions, the amount of the circulation of the absorbent was adjusted so that a solution-gas ratio was 3.0.

Comparative Example 3

Using an absorbent containing 52% by weight of IPAE as an alkanolamine under long-time operation simulation conditions, the amount of the circulation of the absorbent was adjusted so that a solution-gas ratio was 3.0.

The results of the above Examples and Comparative Examples are collectively shown in FIG. 3. As is apparent from the results of FIG. 3, even when the alkanolamine is any alkanolamine, the concentrations of ammonia and alkylamine in an absorber column outlet gas decrease to the concentration equal to that in the initial stage where the absorbent contains sufficient organic sulfur compound, under the conditions of Examples. On the other hand, in a state where the situation after a long-time test is simulated, the concentrations of ammonia and alkylamine in an absorber column outlet gas increases to the concentrations that are about three times larger than those in the initial stage, in all Comparative Examples. With respect to the results of EAE and IPAE, the results similar to FIG. 3 were obtained even when compared with only the concentration of an alkylamine.

The above results revealed that the present invention enables inhibition of the progress of oxidation of an alkanolamine in an absorbent by the addition of an oxidation inhibitor in the alkanolamine when the sum of the concentrations of ammonia and alkylamine in an absorber column outlet gas increases, and also revealed that the concentration of the oxidation inhibitor can be adjusted to a proper value without directly measuring the concentration of the oxidation inhibitor in the solution.

It was also revealed that, even when using a mixed amine of an alkanolamine and MEA of the present invention, the concentration can be adjusted similarly to the case of the alkanolamine since a gaseous oxidation decomposition product of MEA is ammonia.

FIG. 2 shows Example of $CO_2$ absorption equipment comprising a controller of the compositional ratio of a carbon dioxide absorbent. The equipment of FIG. 2 comprises the absorber column 7 that brings the exhaust gas 10 containing oxygen and carbon dioxide into contact with the absorbent 9 containing an alkanolamine; the desorber column 8 that heats the absorbent 9 that has absorbed carbon dioxide, thereby recovering carbon dioxide 11; a line through which at least a part of the absorbent 9, that has recovered carbon dioxide in an absorber column, is conveyed to the desorber column 8; a line through which at least a part of the absorbent 9, that has separated carbon dioxide in the desorber column 8, is conveyed to the absorber column 7 as the carbon dioxide absorbent 9; the heat exchanger 3 that perform heat exchange between the solution 9 to be conveyed to the desorber column 8 from the absorber column 7 and the solution 9 to be conveyed to the absorber column 7 from the desorber column 8; and an controller of the additive amount of an oxidation inhibitor, that is configured to sample the exhaust gas 10 treated in the absorber column 7 and to measure the concentrations of the alkylamine and ammonia in the gas by the GC instrument 12, and to add a solution prepared by dissolving an organic sulfur compound in an aqueous alkanolamine solution in advance through the oxidation inhibitor addition port 13 provided in a line circulating from the desorber column 8 to the absorber column 7, according to an increase in the sum of the concentrations of these substances. Use of such controller enables easy control of the concentration of the oxidation inhibitor in the absorbent in $CO_2$ absorption equipment.

EXPLANATION OF SYMBOLS

1: Humidifier;
2: Condenser;
3: Heat exchanger;
4: Preheater;
5: Amine cooler;
6: Gas monitor;
7: Absorption column;
8: Regeneration column;
9: Absorbing solution;
10: Combustion exhaust gas;
11: Carbon dioxide;
12: GC instrument;
13: Oxidation inhibitor addition port

The invention claimed is:

1. A method for treating an exhaust gas containing carbon dioxide ($CO_2$), in which absorption and release of $CO_2$ are performed from an exhaust gas containing carbon dioxide ($CO_2$) using, as a $CO_2$ absorbent, an aqueous solution of an alkanolamine represented by $C_nH_{2n+1}NHC_{n'}H_{2n'+1}O$ (n is any integer of 1 to 4, and n' is any integer of 1 to 3), the method comprising:
measuring the concentration of an alkylamine represented by $C_nH_{2n+1}NH_2$ (n is any integer of 1 to 4) or the sum of the concentration of the alkylamine and the concentration of ammonia in an exhaust gas after absorbing carbon dioxide by the absorbent; and
adding an oxidation inhibitor of the alkanolamine to the $CO_2$ absorbent according to an increase in the concentration of the alkylamine or the sum of the concentration of the alkylamine and the concentration of ammonia.

2. The method according to claim 1, wherein the alkanolamine is one, or two or more compound(s) selected from the group consisting of 2-(methylamino)ethanol, 2-(ethylamino)ethanol, 2-amino-2-methyl-1-propanol, and 2-(isopropylamino)ethanol.

3. The method according to claim 1, wherein the oxidation inhibitor of the alkanolamine is one, or two or more organic sulfur compound(s) selected from mercaptoimidazoles and mercaptobenzimidazoles.

4. A device for treating an exhaust gas containing carbon dioxide, comprising:
an absorber column that brings an absorbent containing an alkanolamine into contact with an exhaust gas containing oxygen and carbon dioxide;
a desorber column that heats the absorbent containing carbon dioxide absorbed therein, thereby recovering carbon dioxide, in which at least a part of the absorbent, that has recovered carbon dioxide in the absorber column, is conveyed to the desorber column, and at least a part of the absorbent, that has separated carbon dioxide in the desorber column, is conveyed, as a carbon dioxide absorbent, to the absorber column;
a heat exchanger configured to perform heat exchange between the solution to be conveyed to the desorber column from the absorber column and the solution to be conveyed to the absorber column from the desorber column;
a gas chromatography instrument configured to measure the concentration of an alkylamine or the sum of the concentration of the alkylamine and the concentration of ammonia in the exhaust gas treated in the absorber column;
an oxidation inhibitor addition port configured to add an oxidation inhibitor of the alkanolamine to the absorbent to be conveyed to the absorber column from the desorber column; and
a controller configured to adjust the additive amount of the oxidation inhibitor of the alkanolamine according to the concentration of the alkylamine or the sum of the concentration of the alkylamine and the concentration of ammonia measured by the gas chromatography instrument.

5. The method according to claim 2, wherein the oxidation inhibitor of the alkanolamine is one, or two or more organic sulfur compound(s) selected from mercaptoimidazoles and mercaptobenzimidazoles.

* * * * *